United States Patent
Cheng et al.

(10) Patent No.: US 12,111,472 B2
(45) Date of Patent: Oct. 8, 2024

(54) OPTIC SYSTEM FOR HEAD WEARABLE DEVICES

(71) Applicant: HES IP HOLDINGS, LLC, Austin, TX (US)

(72) Inventors: Ken-Yu Cheng, Taichung (TW); Guo-Hsuan Chen, Taichung (TW); Feng-Chun Yeh, Taipei (TW)

(73) Assignee: HES IP HOLDINGS, LLC, Austin, TX (US)

( * ) Notice: Subject to any disclaimer, the term of this patent is extended or adjusted under 35 U.S.C. 154(b) by 0 days.

(21) Appl. No.: 18/019,551

(22) PCT Filed: Jun. 28, 2022

(86) PCT No.: PCT/US2022/035337
§ 371 (c)(1),
(2) Date: Feb. 3, 2023

(87) PCT Pub. No.: WO2023/278465
PCT Pub. Date: Jan. 5, 2023

(65) Prior Publication Data
US 2023/0314805 A1    Oct. 5, 2023

Related U.S. Application Data

(60) Provisional application No. 63/326,281, filed on Apr. 1, 2022, provisional application No. 63/215,995, filed on Jun. 29, 2021.

(51) Int. Cl.
*G02B 27/01*    (2006.01)
*G02B 26/08*    (2006.01)

(52) U.S. Cl.
CPC ..... *G02B 27/0172* (2013.01); *G02B 26/0816* (2013.01); *G02B 2027/011* (2013.01); *G02B 2027/0123* (2013.01); *G02B 2027/013* (2013.01)

(58) Field of Classification Search
CPC ............ G02B 27/0172; G02B 26/0816; G02B 2027/011; G02B 2027/0123; G02B 2027/013; G02B 26/101; G02B 27/0101
See application file for complete search history.

(56) References Cited

U.S. PATENT DOCUMENTS

| | | |
|---|---|---|
| 5,663,833 A | 9/1997 | Nanba et al. |
| 11,280,997 B1 * | 3/2022 | Gao ............... G02B 6/0076 |

(Continued)

FOREIGN PATENT DOCUMENTS

| | | |
|---|---|---|
| CN | 102998800 A | 3/2013 |
| WO | 2021/092314 A1 | 5/2021 |

OTHER PUBLICATIONS

1 Taiwanese Office Action, dated Jun. 17, 2023, in a counterpart Taiwanese patent application, No. TW 111124116.

(Continued)

*Primary Examiner* — Ibrahim A Khan
(74) *Attorney, Agent, or Firm* — Chen Yoshimura LLP

(57) ABSTRACT

The present disclosure relates to an optic system for head wearable devices. The optic system comprises a first light emitter for emitting a plurality of first light signals, the first light emitter varies a direction of projection between a first spatial dimension limit and a second spatial dimension limit in a first dimension; a first light redirector; and a second light redirector. A geometry of the first light redirector is configured such that a light signal emitted by the first light emitter in proximity to the first spatial dimension limit has a total optical path length from the first light emitter to the eye of the viewer substantially equal to a total optical path length of another light signal emitted by the first light emitter in proximity to the second spatial dimension limit from the first light emitter to the eye of the viewer.

20 Claims, 15 Drawing Sheets

(56) References Cited

U.S. PATENT DOCUMENTS

| | | | |
|---|---|---|---|
| 11,714,326 B2* | 8/2023 | Oh | G02B 26/0825 |
| | | | 349/115 |
| 2014/0266987 A1* | 9/2014 | Magyari | G02B 27/0176 |
| | | | 345/8 |
| 2016/0349516 A1* | 12/2016 | Alexander | G02B 5/32 |
| 2018/0275410 A1* | 9/2018 | Yeoh | H04N 13/279 |
| 2018/0356639 A1* | 12/2018 | Schaefer | G02B 27/0172 |
| 2019/0129178 A1* | 5/2019 | Patterson | G02B 6/0076 |
| 2019/0171005 A1* | 6/2019 | Lee | G02B 6/005 |
| 2020/0033606 A1* | 1/2020 | Takeda | G02B 17/082 |
| 2020/0195912 A1* | 6/2020 | Smith | H04N 13/332 |
| 2020/0209629 A1* | 7/2020 | Suzuki | G02B 17/0663 |
| 2021/0239979 A1* | 8/2021 | Georgiou | G02B 27/0172 |

OTHER PUBLICATIONS

International Search Report in the parent PCT application No. PCT/US2022/035337, dated Oct. 4, 2022.

Written Opinion in the parent PCT application No. PCT/US2022/035337, dated Oct. 4, 2022.

* cited by examiner

OPTIC SYSTEM FOR HEAD WEARABLE DEVICES

RELATED APPLICATION

This application claims the benefit of the provisional application 63/215,995 filed on Jun. 29, 2021, titled "LASER BEAM SCANNING OPTICAL ENGINE AND DEVICE THEREOF", and the provisional application 63/326,281 filed on Apr. 1, 2022, titled "SYSTEM AND MECHANISM FOR WEARABLE DISPLAY DEVICES", which is incorporated herein by reference at its entirety.

BACKGROUND OF THE INVENTION

Field of the Invention

The present invention relates to optic system for head wearable display devices; more particularly, image display system for correcting image distortion and chromatic aberration for head wearable display devices. The present invention further relates to system for improving eye-relief, field of view, and form factor for head wearable display devices.

DESCRIPTION OF RELATED ART

For head wearable devices that implement waveguide for transmitting light from the light sources to display images, there is no image correction mechanism while it suffers image distortion due to light scattering in the course of transmission via the waveguide. As for head wearable devices implementing retinal scanning display, they rely on optical combiners for directing light emitted by the light emitter into the viewer's eyes. The curvature of the surface of the optical combiners is modified for controlling the direction of the light so that light can be focused and render images for the viewer. However, the geometry of the surface of the optical combiner directly affects the final shape of the image frame produced. As an example, in some instances, it may be preferred to have rectangular shaped image frame for displaying virtual image. However, the shape of the image frame is often not perfectly rectangular shaped (i.e., distorted). In conventional art, the shape of the image frame may be modified digitally; however, this may require additional system of circuitry to perform such task, which can increase the overall hardware volume of the head wearable device. Furthermore, digital distortion correction oftentimes implements frame trimming which removes small portions of the image frame (particularly the distorted portion) to obtain the proper shape of the image frame; however, this may result undesirable resolution or image information lost. In addition, the "eye relief" of an optical instrument refers to the distance from the eye of the viewer to the closest eyepiece or optical element of the optical instrument. This distance directly affects form factor of the head wearable device, as well as the maximum field of view and image quality that can be perceived by the viewer. The eye relief in the conventional head wearable devices are often much larger than that of the conventional eyeglasses, which causes the conventional eyeglasses to be bulky. Furthermore, the field of view in the conventional head wearable devices are often insufficient for higher quality image rendering. Therefore, a new optical system for head wearable devices with enhancing form factor which can retain the desirable shape of the image frame is desirable.

SUMMARY

The optic system for head wearable devices (HWDs) in accordance with an embodiment of the present invention comprises a first light emitter, a first light redirector, a second light redirector, and a third light redirector. The first light emitter is configured for emitting a plurality of first light signals. The direction of projection is varied in at least one dimension. The first light redirector, the second light redirector, and the third light redirector receive the plurality of first light signals and change the direction of each of the plurality of first light signals. The first light redirector receives the plurality of first light signals and directs the plurality of first light signals toward the third light redirector, the third light redirector directs the plurality of first light signals received from the first light redirector toward the second light redirector, the second light redirector directs the plurality of first light signals received from the third light redirector toward an eye of a viewer, so the viewer perceives an image frame.

In some embodiments, the first light redirector and the second light redirector may respectively have at least one focus. The first light redirector or the second light redirector may have two or more than two foci.

Each of the of the plurality of first light signals has a different optical path. A total optical path length from the first light emitter to the eye of the viewer of a first light signal of the plurality of first light signals not being emitted in proximity to the first spatial dimension limit or the second spatial dimension limit is substantially equal to the total optical path length of the light signal emitted by the first light emitter in proximity to the first spatial dimension limit and the second spatial dimension limit.

In an embodiment of the present invention, the third light redirector is located in proximity to (or nearly at) a first focus of the first light redirector and a first focus of the second light redirector. The first light redirector receives the plurality of first light signals emitted from the first light emitter and directs all the first light signals towards the first focus of the first light redirector where the plurality of first light signals having different optical paths is focused. The light emitter may be provided in proximity to the second focus of the first light redirector. In this configuration, the magnitude of the change in the direction of projection can be maximize and ensuring all the light signals can be received by the first light redirector. The eye of the viewer is located in proximity to (or nearly at) a second focus of the second light redirector.

In some embodiments, the first light redirector comprises two foci located on the same side of the first light redirector. The third light redirector is located in proximity to the first focus of the first light redirector and the first focus of the second light redirector. The first light emitter may be located in proximity to a second focus of the first light redirector. In some variations of the present invention, the second light redirector comprises two foci located in a space between the second light redirector and the eye of the viewer. The eye of the viewer is located in proximity to a second focus of the second light redirector. The advantageous of having such configuration are readily describe previously.

In an alternative embodiment of the present invention, the optic system for head wearable devices comprises the first light emitter, the first light redirector, and the second light redirector. The third light redirector from the previous embodiment is omitted in this embodiment. The first light redirector receives the plurality of first light signals and changes a direction of each of the plurality of first light signals. The second light redirector directs the plurality of first light signals received from the first light redirector toward an eye of a viewer, so the viewer perceives the image frame. The first light redirector and the second light redirector is positioned such that the first focus of the first light redirector and the first focus of the second light redirector are at a same spatial location. The first light redirector can be position at a vertical position higher than the second light redirector. In this embodiment, the geometry of the first light redirector is also configured so that a light signal emitted by the first light emitter in proximity to the first spatial dimension limit has a total optical path length from the first light emitter to the eye of the viewer substantially equal to a total optical path length of another light signal emitted by the first light emitter in proximity to the second spatial dimension limit from the first light emitter to the eye of the viewer.

In another alternative embodiment of the present invention, the optic system for HWDs comprises a first light emitter, a combiner, and a correction assembly. The correction assembly may comprise a first transitional mirror, a second transitional mirror, and a first parabolic reflector. Both the first transitional mirror and the second transitional mirror are located in between the first parabolic reflector and the combiner. The combiner may be a parabolic reflector. The light signals produced by the first light emitter is initially reflected by the first parabolic reflector of the correction assembly to the transitional mirror. In some embodiment, a third transitional mirror may be provided between the first transitional mirror and the first transitional mirror for increasing the optical path length of the light. The first parabolic reflector is meant to provide a complimentary light profile to the combiner. The light signals between the first transitional mirror and the second transitional mirror are also parallel with each other. This is advantages because the optical path length in between the first transitional mirror and the second transitional mirror can be adjust as desired based on form factor.

The optic system for HWDs according to the present invention can further comprise a second light emitter for emitting a plurality of second light signals. Each of the plurality of first light signals and the corresponding second light signal can be perceived by the eyes of the viewer to form a binocular light signal via fusion of human vision; the viewer can only perceive on single binocular light signal composed of a single first light signal and the corresponding second light signal. The optic system further comprises a fourth light redirector, and a fifth light redirector for receiving the plurality of second light signals and changing a direction of each of the plurality of second light signals. Similar to the first and second light redirectors, the fourth light redirector receives the plurality of second light signals and directs the plurality of second light signals toward the fifth light redirector, the fifth light redirector directs the plurality of second light signals received from the fourth light redirector toward an another eye of the viewer such that the plurality of second light signals is projected toward an another retina of the viewer. A first virtual image composed of the plurality of first light signals is perceived by the viewer as on a side of the second light redirector opposite to a side where the eye of the viewer is located; similarly, another virtual image composed of the plurality of second light signals is perceived by the viewer as on a side of the fifth light redirector opposite to a side where the eye of the viewer is located. The optic system may further comprise a sixth light redirector for receiving the plurality of second light signals and changing a direction of each of the plurality of second light signals. In this case, the fourth light redirector receives the plurality of second light signals and directs the plurality of second light signals toward the sixth light redirector, the sixth light redirector directs the plurality of second light signals received from the fourth light redirector toward the fifth light redirector, the fifth light redirector directs the plurality of second light signals received from the sixth light redirector toward the another eye of the viewer. In the present embodiment, the fourth light redirector is equivalent to the first light redirector; the fifth light redirector is equivalent to the second light redirector; and the third light redirector is equivalent to the sixth light redirector.

In one embodiment, the viewer perceives a binocular virtual image form by fusion of the first virtual image and the second virtual image. The depth perception of the binocular virtual image is controlled by adjusting an angle of convergence formed between the optical path extension of the first light signal and the optical path extension of the second light signals. The direction of the optical path extension of the first light signal and the second light signal can be varied by controlling a direction of projection (which is regulated by e.g., a MEMS mirror within the light emitter) of the first light emitter and the second light emitter. This method for creating depth perception of the virtual image is consistent with natural vision of the human eyes because human brain determines a depth of an object in 3-dimensional space at least in part based on the angle of fixation of the eye, which is directly related to the angle of convergence formed between the optical path extension of the first light signal and the optical path extension of the second light signal. In some embodiments of the present invention, the right light signal and the corresponding left light signal for a virtual binocular pixel display an image of the same view angle.

With the design of the present embodiment, a FOV of approximately 60 degrees in the horizontal direction can be achieved. Furthermore, the FOV in the vertical direction on left side of the image frame is approximately the same as the FOV in the vertical direction on the right side of the image frame (1:1 ratio). The FOV in the horizontal direction on the top of the image frame is also similar to that of the bottom of the image frame.

DETAILED DESCRIPTION OF PREFERRED EMBODIMENTS

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The present invention is directly related to an improved optic system for augmented reality or virtual reality head wearable devices. The current augmented reality (AR) or virtual reality (VR) head wearable devices (HWD) oftentimes utilize spherical lenses or waveguide along with a display screen/panel for rendering virtual images. The current augmented AR/VR HWDs often have large eye relief (which is referred to the distance from the eye of the viewer to the closest eyepiece or optical element of the optical instrument); as a result, they suffer poor form factor and usability for daily usage. Unlike the current AR/VR HWDs, the present invention implements a novel way for rendering 3-dimensional image in 3-dimensional space with depth. As a result, the realization of an improved optic system with superior form factor and short eye relief is possible. In addition to these mentioned advantages, the present invention also creates large field of view (FOV) for the viewer, while suffering little image distortion. Since the FOV is drastically increased, the effective eyebox (which may be referring to a volume where the eye receives an acceptable view of the virtual image) is also expanded for the eye of the viewer; this is because with shorter eye relief, it is easier for the user to see the light signals projected by the light emitter of the HWD. The present invention may involve multiple non-spherical or freeform lenses/optical elements and direct retina scanning technology to direct light signals projected by the light emitter to the eye of the viewer.

Figure 1:
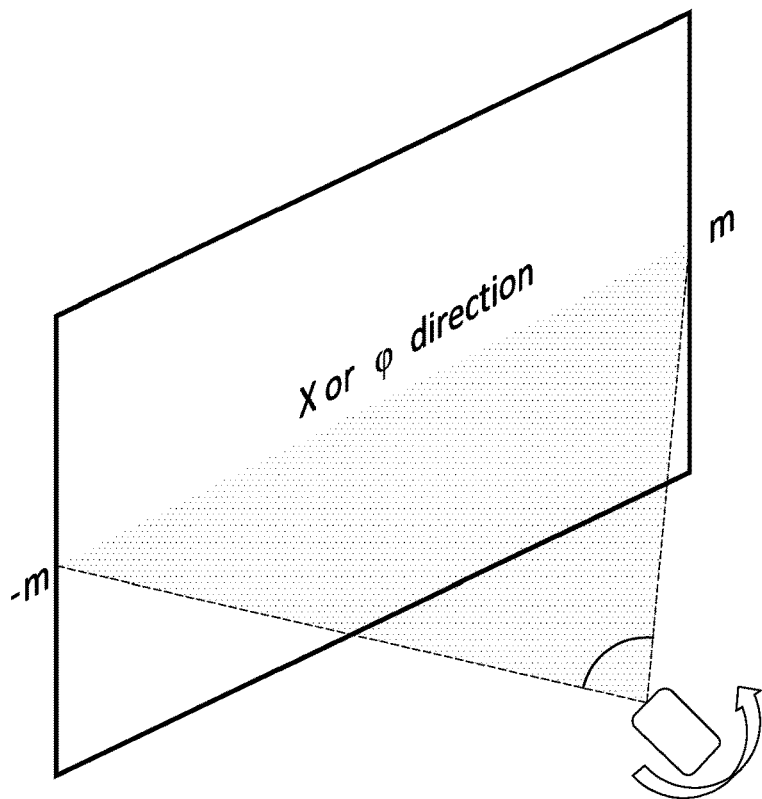
FIG. 1 illustrates the background knowledge related to the present invention.
Figure 1:
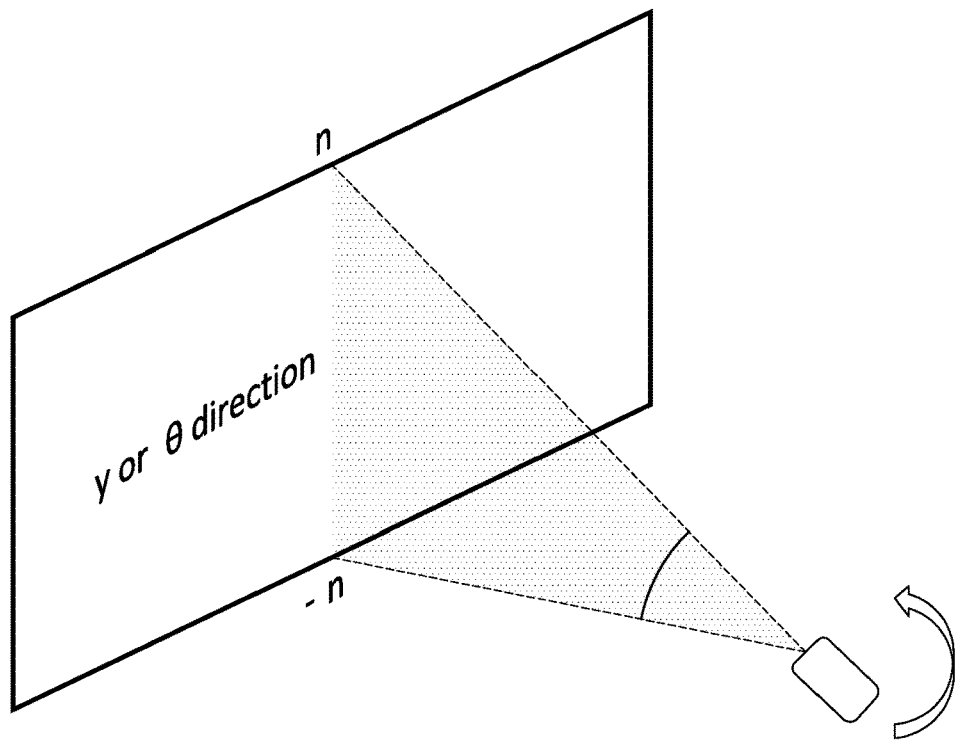

With reference to FIG. 1, the light emitter mentioned in the present invention may refer to any light emitting mechanism which varies the direction of projection in one spatial dimension (e.g., in x coordinate dimension or y coordinate dimension in the Cartesian coordinate system, or in θ coordinate dimension or φ coordinate dimension in the polar coordinate system), or two spatial dimensions (e.g., in both x coordinate dimension and y coordinate dimension in the Cartesian coordinate system, or in both φ coordinate dimension and θ coordinate dimension in the polar coordinate system) to produce an image frame by emitting a plurality of light signals which forms the pixels of the image frame (which is made possible by vision persistence of human eyes). As an example, the direction of projection may be altered by implementing micro electromechanical system (MEMS) based reflective system such as MEMS mirrors.

Furthermore, it can be understood that there exist two spatial limits between which the light emitter can turn (or move linearly) while project a plurality of light signals to form a virtual image or virtual image frame. Specifically, suppose the image frame produced by the light emitter has a rectangular shape, the direction of projection of the light emitter is varied in two coordinate dimensions (i.e., in x and y coordinate dimensions or in φ and θ coordinate dimensions). For each of the two coordinate dimensions, there are two limits between which the direction of projection is varied. With reference to FIG. 1, as an example, the direction of projection of the light emitter is varied between −m and m, where −m and m are coordinates in D direction (or x direction) in the polar coordinate system and both −m and m are considered as spatial dimension limits in φ direction (which is the limit that the light emitter can turn; it can be expressed in degree of angle). In another embodiment, the direction of projection of the light emitter is varied between −n and n, where −n and n are coordinates in y direction in the Cartesian coordinate system (or θ in the polar coordinate). In this case, −m and m, and −n and n are considered as spatial dimension limit. For example, −m or −n may be referred as the first spatial dimension limit; and m or n may be referred as the second spatial dimension limit.

A specific example for the light emitter described in the present invention may be laser beam scanning projector (LBS projector) which may comprise a red color light laser, a green color light laser, and a blue color light laser for producing different colors of light. Furthermore, for example, each of the image frame may contain 1280×720 pixels, which are composed of 1280×720 light signals. Other light emitters may also be possible for applying to the present invention.

The term "light redirector" in the present invention refers to any optical elements that are configured to change the direction which light travels after light encounters or incidents on the optical elements. For examples, light redirector can be any optical lens, mirror, reflector, refractor, elliptical lens/reflector, spherical lens/reflector, parabolic surface reflector, non-spherical lens/reflector, freeform optical lens/reflector, or meta-surface reflector . . . etc.

In the present invention, the phrase "substantially equal to" is used to discuss the optical path lengths of different light signals. It should be understood that when two optical path length are considered "substantially equal to", it means said two optical path length have a difference that is less than 5%. The phrase "in proximity to" refers to an object (i.e., any portions of the object) is configured to be as close to a position (or another object) as possible but may not be at the position due to measuring error, manufacturing error, allowable engineering tolerance, or any other types of physical limitations.

The image distortion mentioned herein refers to change in shape of the actual image frame received by the eye of the viewer relative to the intended/ideal shape of the image frame received by the eye of the viewer. In some instances, the image distortion may be referring to the change in shape of the actual image frame received by an optical element of the HWD relative to the intended/ideal shape of the image frame received by said optical element. Yet in another instance, the distortion of the image frame may be referring to the shift in the length of a side of the image frame relative to the other corresponding side of the image frame. As an example (with reference to FIG. 2), in the case which the shape of the image frame is intended to have a quadrilateral shape, the image frame may have a first side s1, a second side s2, a third side s3, and a fourth side s4. The first side s1 and the third side s3 correspond to the left edge and the right edge of the image frame, and the first side s1 and the third side s3 are comprised of a same number of light signals (pixels; e.g., 760 pixels). The second side s2 and the fourth side s4 corresponds to the upper edge and lower edge of the image frame, and the second side s2 and the fourth side s4 are comprised of a same number of light signals (pixels; e.g., 1280 pixels). The first side s1 and the third side s3 should have the same length; and the second side s2 and the fourth side s4 should have the same length. In this case, the distortion of the image frame in a first dimension can be measured by calculating the ratio between the length of the first side s1 to the length of the third side s3. By the same token, the distortion of the image frame in a second dimension can be measured by calculating the ratio between the length of the second side s2 to the length of the fourth side s4. A ratio deviate from 1 means the distortion of the image frame in the first or second dimension is worsen. For convenience purpose, the lengths of the sides of the image frame are not measured with conventional length units (mm, and cm . . . etc.). The size of the sides of the image frame are expressed in terms of FOV, which is an angle and is expressed in degrees. More specifically, each of the edges of the image frame represent the spatial range in which the viewer can see the virtual image. Therefore, the lengths of the sides of the image frame are directly correlates to the vertical and horizontal FOV which the viewer can see (with reference to FIGS. 2 and 3).

Figure 4:
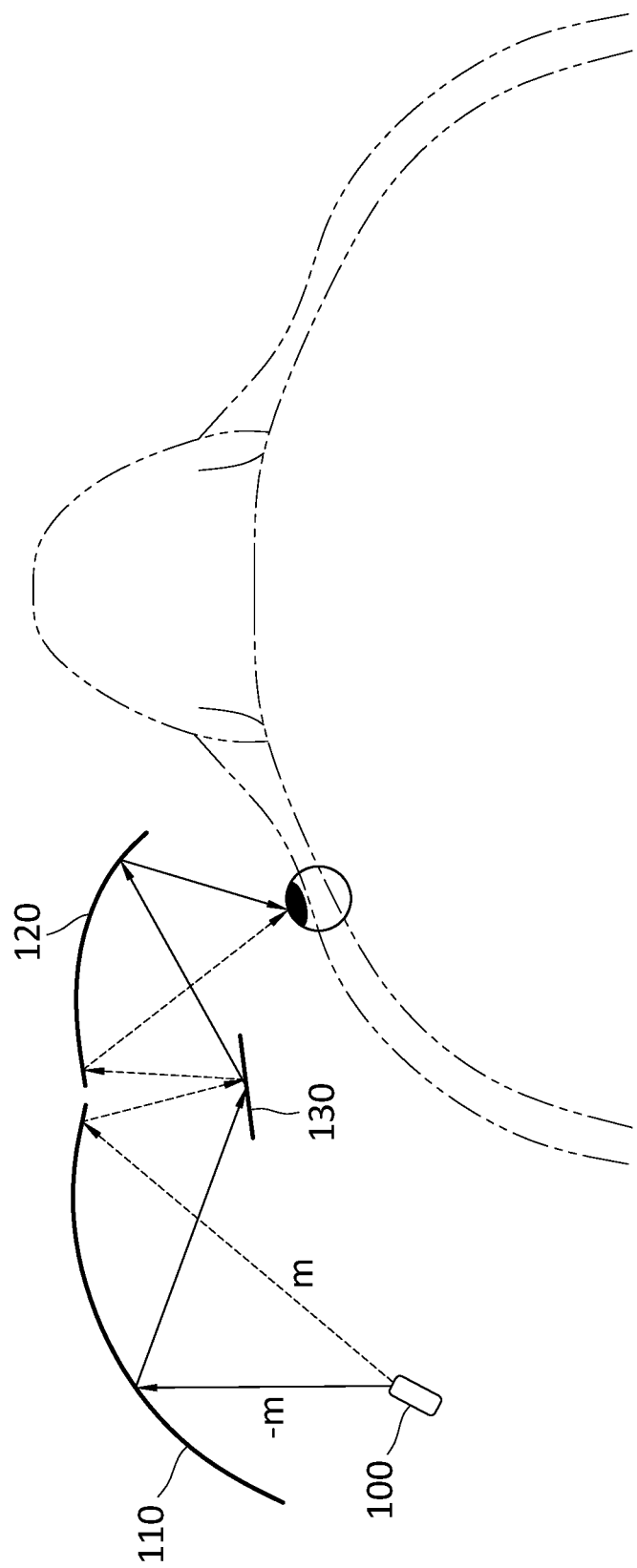
FIG. 4 is a schematic diagram illustrating an embodiment of the present invention.

With reference to FIG. 4, it illustrates the optic system for HWDs in accordance with an embodiment of the present invention. For the purpose of simplicity, only one side of the optic system is shown. However, it should be understood that the present invention can be applied to one eye of the viewer or both eyes of the viewer. The optic system for HWDs comprises a first light emitter 100, a first light redirector 110, a second light redirector 120, and a third light redirector 130. The first light emitter 100 is configured for emitting a plurality of first light signals. As previously mentioned, the first light emitter 100 varies the direction of projection between a first spatial dimension limit and a second spatial dimension limit in a first dimension. The first dimension may be x coordinate dimension or y coordinate dimension in the Cartesian coordinate system, or θ coordinate dimension or φ coordinate dimension in the polar coordinate system. The direction of projection is varied in at least one dimension. When the direction of projection is varied in two dimensions, an image frame may be formed. As an example, the first spatial dimension limit and the second spatial dimension are respectively referring to −m and m, between which the first light emitter 100 emits the plurality of light signals. As an example, in some instances, when the direction of projection is varied in the x direction (e.g., horizontal direction), the light signals emitted in proximity to the first spatial dimension limit create the left edge of the image frame; and the light signals emitted in proximity to the second spatial dimension limit creates the right edge of the image frame. As an example, the first spatial dimension limit and the second spatial dimension are respectively referring to −n and n, between which the first light emitter 100 emits the plurality of light signals. As an example, in some other instances, when the direction of projection is varied in the y direction (e.g., vertical direction), the light signals emitted in proximity to the first spatial dimension limit create the upper edge of the image frame; and the light signals emitted in proximity to the second spatial dimension limit creates the lower edge of the image frame.

With reference to FIG. 4, the first light redirector 110, the second light redirector 120, and the third light redirector 130 receive the plurality of first light signals and change the direction of each of the plurality of first light signals. Each of the of the plurality of first light signals has a different optical path. The first light redirector 110 receives the plurality of first light signals and directs the plurality of first light signals toward the third light redirector 130, the third light redirector 130 directs the plurality of first light signals received from the first light redirector 110 toward the second light redirector 120, the second light redirector 120 directs the plurality of first light signals received from the third light redirector 130 toward an eye of a viewer, so the viewer perceives an image frame, which is composed of the plurality of first light signal (pixels). The first light redirector 110 and the second light redirector 120 may respectively have at least one focus. In other embodiments, the first light redirector 110 or the second light redirector 120 may have two or more than two foci.

Figure 5:
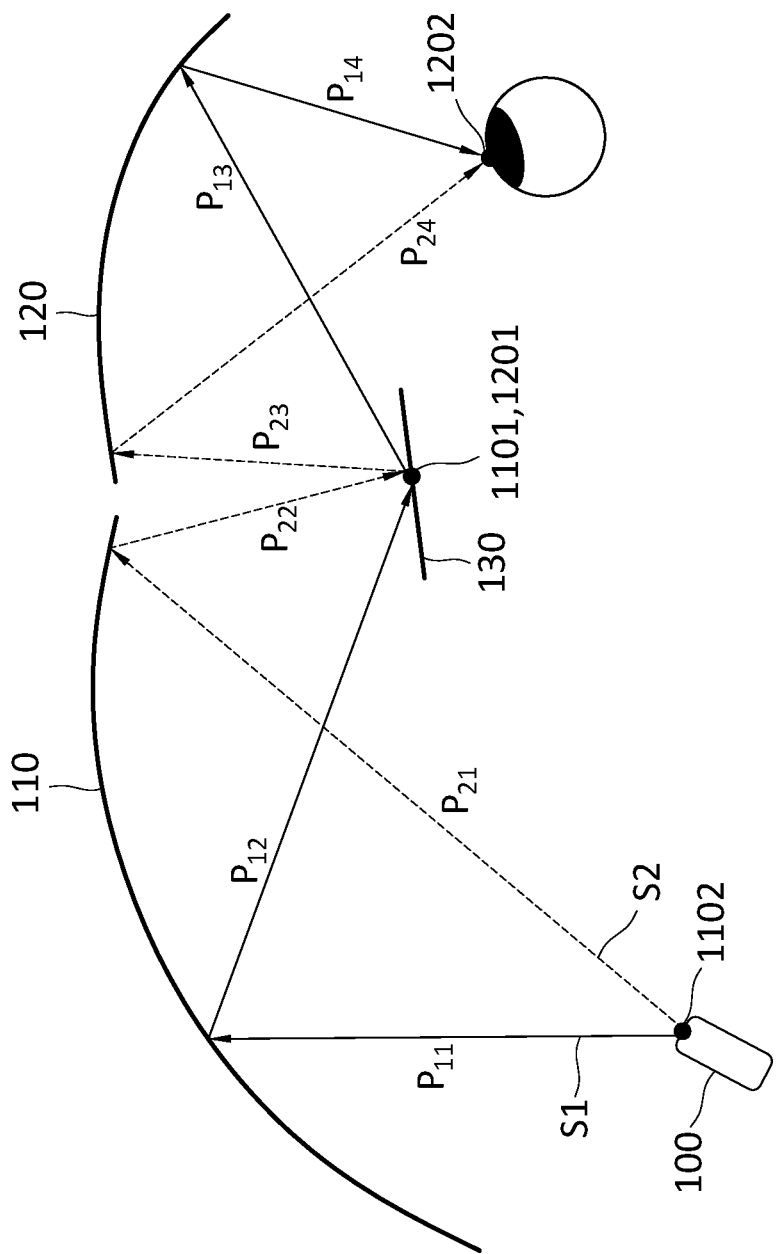
FIG. 5 is another schematic diagram illustrating an embodiment of the present invention.

With reference to FIG. 5, in an embodiment of the present invention, the third light redirector 130 is located in proximity to (or nearly at) a first focus of the first light redirector 1101 and a first focus of the second light redirector 1201 (the first focus of the first light redirector 1101 and a first focus of the second light redirector 1201 are at the same spatial location). The first light redirector 110 receives the plurality of first light signals emitted from the first light emitter 100 and directs all the first light signals towards the first focus of the first light redirector 1101 where the plurality of first light signals having different optical paths is focused. The physical size of the third light redirector 130 can be much smaller relative to the first light redirector 110 since it is located at the focus of the first light redirector 110 and requires little amount of surface for receiving the plurality of first light signals from the first light redirector 110. This is particular advantageous for the design of HWDs because the physical size of the HWDs can be drastically reduced. Furthermore, by placing the third light redirector 130 in proximity to the first focus of the first light redirector 1101, all the light signals from the first light redirector 110 can be received by the third light redirector 130. In this embodiment, the third light redirector 130 is also positioned in proximity to (or nearly at) the first focus of the second light redirector 1201, such that the second light redirector 120 can receive all the first light signals from the third light redirector 130.

In some instances (with reference to FIG. 5) the first light redirector 110 may comprise a second focus 1102. The first light emitter 100 is provided in proximity to (or nearly at) the second focus of the first light redirector 1102. In this configuration, the magnitude of the change in the direction of projection can be maximize and ensuring all the light signals can be received by the first light redirector 110. Notice that in the present invention, the first focus of the first light redirector 1101, the second focus of the first light redirector 110, and the first focus of the second light redirector 1201 are not align in a same line (not collinearly arranged). In this way, these optical elements can be arranged in a more compact manner so as to reduce the final physical size of the HWD. As shown in FIG. 5, in some instances, to insure the eye of the viewer can benefit from the full FOV created by the optical system in accordance with the present invention, as well as to ensure the viewer can perceive the entire image frame, the eye of the viewer is located in proximity to (or nearly at) a second focus of the second light redirector 1202.

Figure 6A:
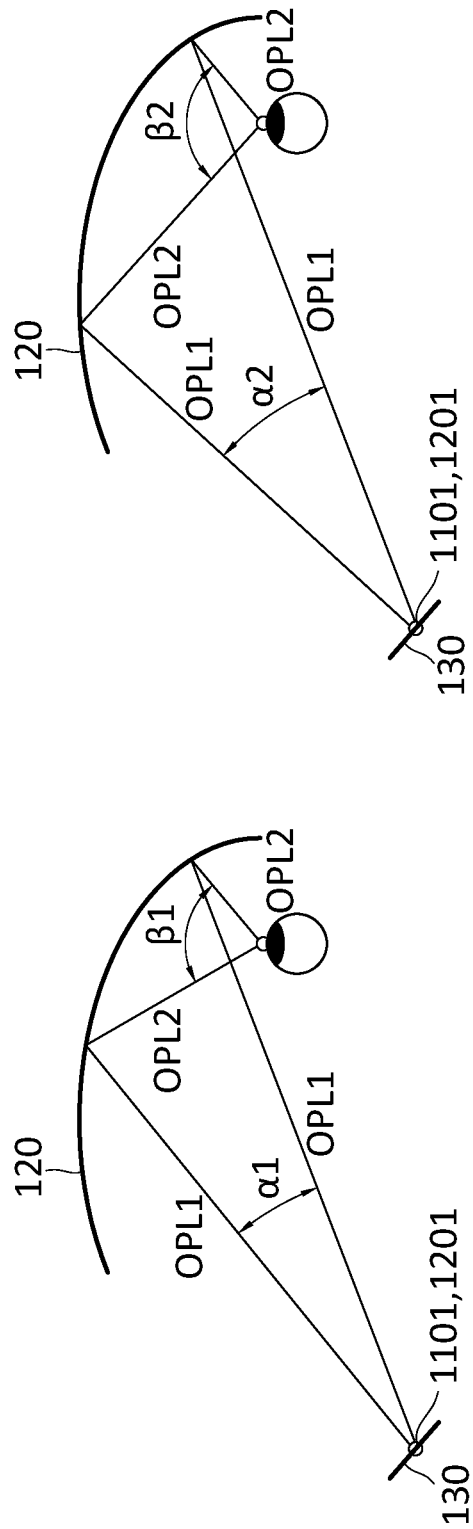
FIG. 6A is a schematic diagram for explaining how to reduce distortion and increase FOV of an image frame according to an embodiment of the present invention.
Figure 6B:
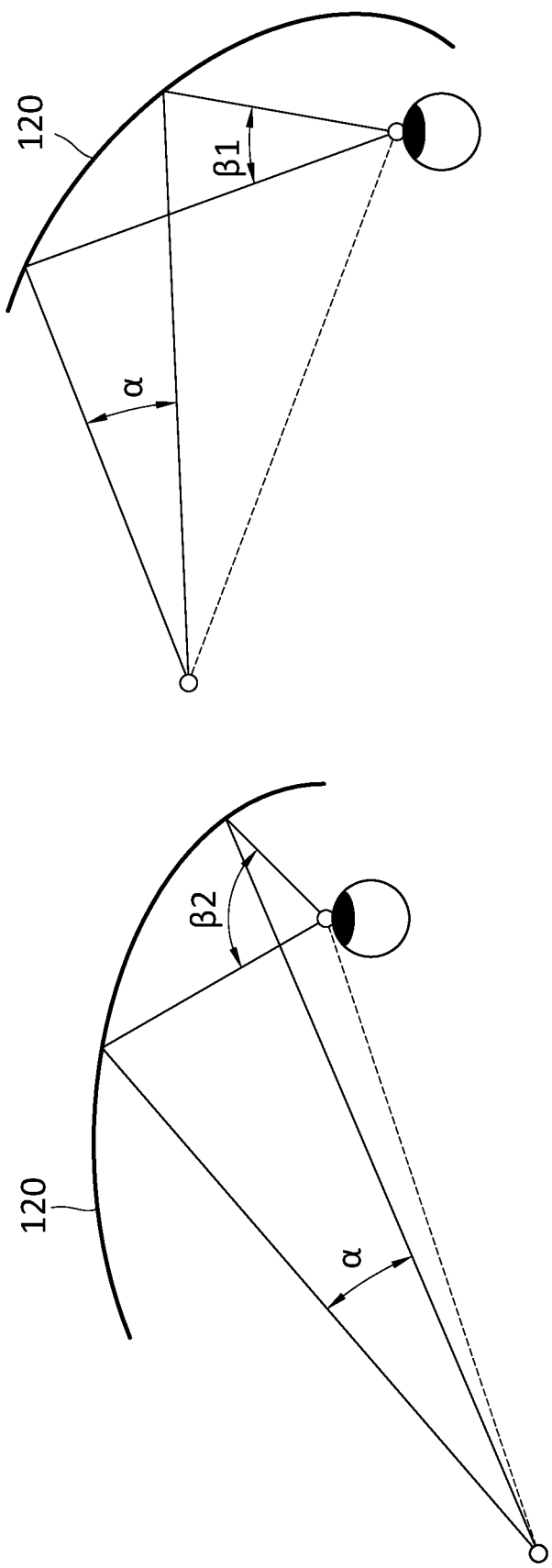
FIG. 6B is another schematic diagram for explaining how to reduce distortion and increase FOV of an image frame according to an embodiment of the present invention.
Figure 6C:
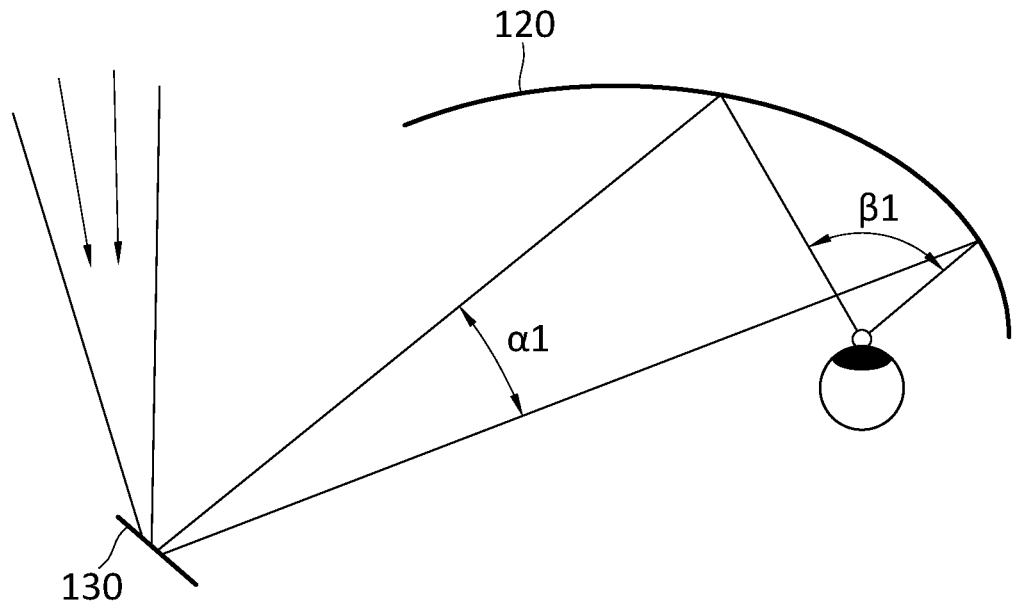
FIG. 6C is another schematic diagram for explaining how to reduce distortion and increase FOV of an image frame according to an embodiment of the present invention.
Figure 6C:
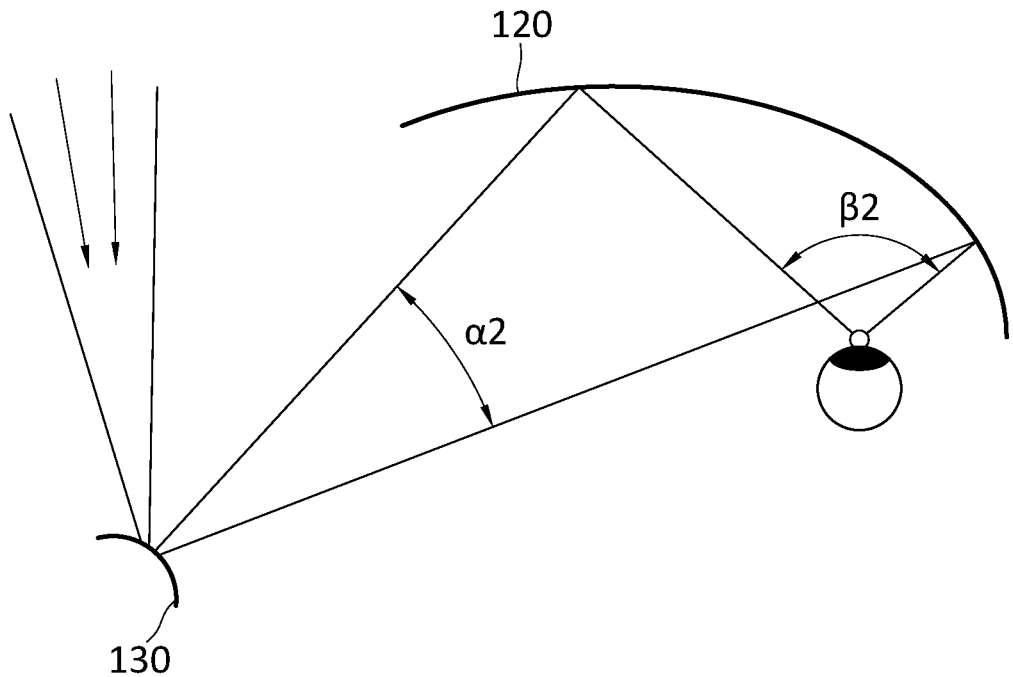

With reference to FIGS. 6A-6C, the converge angle β1 and β2 of the first light signals redirected by the second light redirector 120 toward the eye of the viewer is directly related to the FOV of the image frame; and the converge angle β1 and β2 are directly affected by the dispersion angle α1 and α2. In another words, the FOV of the image frame changes along with the change in the dispersion angle α. If the dispersion angle α increases, the FOV increases as well. With reference to FIGS. 5 and 6A-6C, the FOV of the image frame can be modified by altering the difference between the optical path length from the third light redirector 130 to the surface of the second light redirector 120 and the optical path length from the surface of the second light redirector 120 to the eye of the viewer. More specifically (with reference to FIG. 6A), when the optical path length (for a light signal) from the third light redirector 130 to the surface of the second light redirector 120 (denoted by OPL1) decreases relative to the optical path length from the surface of the second light redirector 120 to the eye of the viewer (denoted by OPL2), the FOV of the image frame decreases; on the other hand, when the optical path length (for a light signal) from the third light redirector 130 to the surface of the second light redirector 120 increases relative to the optical path length from the surface of the second light redirector 120 to the eye of the viewer, the FOV of the image frame increases. There are several factors that can affect the difference between OPL1 and OPL2. The following describes the factors and methods for modifying the difference between OPL1 and OPL2, and thus, altering the FOV of the virtual image.

The orientation of the second light redirector 120 can be modified to change the difference between OPL1 and OPL2. With reference to FIG. 6B, both figures illustrate the plurality of light signals with the same dispersion angle α from the third light redirector 130 (or from the first light redirector 110); when the plurality of light signals is directed to different portions of the surface of the same second light redirector 120 (thereby changing the difference between OPL1 and OPL2), converge angle (β1 and β2) may still be different. The orientation of the second light redirector 120 relative to the eye of the viewer may be expressed by the angle of an axis of the second light redirector 120 (e.g., the axis that passes through both the first and second focus of the second light redirector 120) relative to the eye of the viewer. In some other embodiments, if the eye of the viewer is located at the second focus of the second light redirector 1202, the orientation may be expressed by the relative location of the first focus of the second light redirector 1201 relative to the eye of the viewer. As shown in FIGS. 6A and 6B, by changing the orientation of the second light redirector 120, the difference between OPL1 and OPL2 is affected to yield different FOV. In some embodiments, the geometry of the second light redirector 120 can be modified to optimize the difference between OPL1 and OPL2 to create the desirable FOV. Yet in another embodiment, the angle of incident of the light signal from the first light redirector 110 to the third light redirector 130 can be modified (thereby changing the magnitude of dispersion angle α, or changing the location of the light signals on the second light redirector 120) to affect the difference between OPL1 and OPL2 to create the desirable FOV.

In addition to changing the difference between OPL1 and OPL2, with reference to FIG. 6C, the geometry of the third light redirector 130 can be configured to alter the FOV of the image frame projected to the viewer's eye. For example, the curvature of the third light redirector 130 may be changed to be concave, convex or flat depending on the applications such that a dispersion angle α of the plurality of first light signals redirected toward the second light redirector 120 from the third light redirector 130 can be altered. As an example, FIG. 6C shows to configuration of the third light redirector 130, one of which is flat and the other is convex. The convex third light redirector 130 creates a larger dispersion angle relative to the flat third light redirector 130 (α2>α1). In some embodiments, it may be desirable for the light incident surface of the third light redirector 130 to be convex to maximized dispersion angle α while ensuring all of the first light signals are received by the second light redirector 120 and redirected by the second light redirector 120 toward the eye of the viewer by setting the third light redirector 130 and the eye of the viewer at different foci of the second light redirector 120. In some other embodiments, the angle of the reflection of the third light redirector 130 can be adjusted to change the FOV of the virtual image. The angle of the reflection can be modified simply by rotating the third light redirector 130 toward a particular direction.

Figure 7:
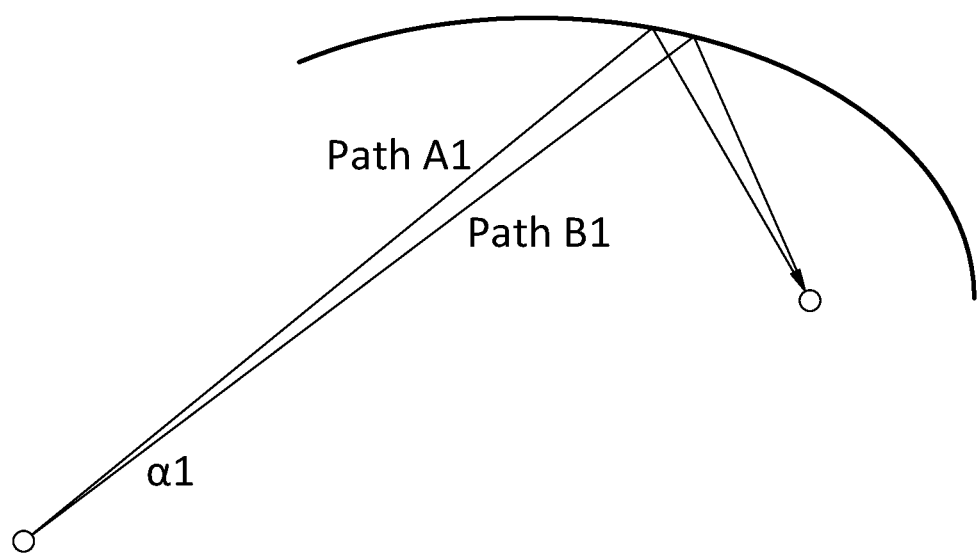
FIG. 7 explain the concept of optical path length difference amount different light signals according to an embodiment of the present invention.
Figure 7:
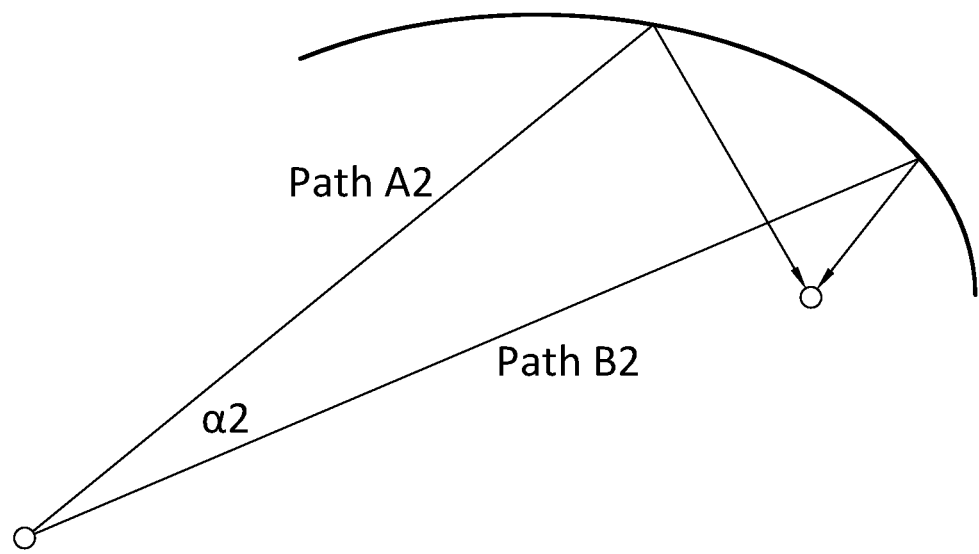

Although larger FOV is generally desirable; however, it is known that the distortion of image frame will be worsen when the dispersion angle α is increased due to the fact that the optical path length difference among different light signals increases along with the increase in the dispersion angle α (as shown in to FIG. 7, the optical path length difference between path A1 and B1 is smaller than the optical path length difference between path A2 and B2). In other words, optical path length difference among the plurality of light signals is the key factor for creating image frame distortion. With reference to FIG. 5 again, to resolve this issue, the present invention implements at least two light redirectors (i.e., the first and second light redirectors) to counter balance the optical path length difference among the light signals. The geometry of the first light redirector 110 is configured to compensate for the optical path length difference such that the light signal emitted by the first light emitter 100 in proximity to the first spatial dimension limit (which corresponds to the edge of the image frame) has a total optical path length from the first light emitter 100 to the eye of the viewer substantially equal to a total optical path length of another light signal emitted by the first light emitter 100 in proximity to the second spatial dimension limit (which corresponds to another edge of the image frame) from the first light emitter 100 to the eye of the viewer. With this method, the distortion among the edges of the image frame can be remedied. More specifically, with reference to FIG. 5, the optical path length for a light signal S1 from the third light redirector 130 to the eye of the viewer is $P_{13}+P_{14}$; the optical path length for a light signal S2 from the third light redirector 130 to the eye of the viewer is $P_{23}+P_{24}$. For the case where $P_{13}+P_{14}>P_{23}+P_{24}$ (S1 has a greater optical path length than S2 from the from the third light redirector 130 to the eye of the viewer), the geometry of the first light redirector 110 is configure such that that $P_{11}+P_{12}<P_{21}+P_{22}$ (S1 has a shorter optical path length than S2 from the light emitter 100 to the third light redirector 130). As a result, the total optical path length for a light signal S1, which is $P_{11}+P_{12}+P_{13}+P_{14}$ is sustainably the same as the total optical path length for a light signal S2, which is $P_{21}+P_{22}+P_{23}+P_{24}$. With the same logic, for the case where $P_{13}+P_{14}<P_{23}+P_{24}$, the geometry of the first light redirector 110 is configure such that that $P_{11}+P_{12}>P_{21}+P_{22}$. The geometry of the optical elements (including the first light redirector 110, the third light redirector 130, and the second light redirector 120) mentioned in the present invention may refer to the curvature of a surface of the optical elements, the shape of the optical elements, the orientation of the major/minor axis of the optical elements, and/or the location of the optical elements. In some instances, the geometry of the optical element affects the location of the foci of the optical elements, as well as other optical properties of the optical element.

The aforementioned method for eliminating image frame distortion among the edges of the image frame can be implemented to reduce distortion from other area of the image frame as well. In some embodiments, the geometry of the first light redirector 110, the third light redirector 130, and the second light redirector 120 can be configured such that a total optical path length from the first light emitter 100 to the eye of the viewer of a first light signal of the plurality of first light signals in locations other than the first and second spatial dimension limit is substantially equal to the total optical path length of the light signal emitted in proximity to the first spatial dimension limit and the second spatial dimension limit.

In some embodiments (as shown in the previous figures), the first light redirector 110 comprises two foci located in a space between the first light redirector 110 and the eye of the viewer; or in other words, the two foci are located on the same side of the first light redirector 110. The third light redirector 130 is located in proximity to (or nearly at) the first focus of the first light redirector 1101 and the first focus of the second light redirector 1201 (namely, the first focus of the first light redirector 1101 and the first focus of the second light redirector 1201 are at a same spatial location). Meanwhile, the first light emitter 100 may be located in proximity to a second focus of the first light redirector 110. As an example, the light emitter may comprises a MEMS mirror for changing the direction of projection of the first light signals. The MEMES mirror can be placed in proximity to the second focus of the first light redirector 110. In some variations of the present invention, the second light redirector 120 comprises two foci located in a space between the second light redirector 120 and the eye of the viewer; or the two foci of the second light redirector 120 are located on the same side of the second light redirector 120. The eye of the viewer is located in proximity to a second focus of the second light redirector 1202. The advantageous of having such configuration are readily describe previously. As an example, a surface for receiving the plurality of first light signals of the first light redirector 110 or a surface for receiving the plurality of first light signals of the second light redirector 120 is an elliptic curve in this embodiment; therefore, the surface may have at least two foci. In some embodiments, either a surface for receiving the plurality of first light signals of the first light redirector 110 or a surface for receiving the plurality of first light signals of the second light redirector 120 is an elliptic curve. In some embodiments, both the surface for receiving the plurality of first light signals of the first light redirector 110 and the surface for receiving the plurality of first light signals of the second light redirector 120 are elliptic curves. In some embodiments, the surface for receiving the plurality of first light signals of the first light redirector or the surface for receiving the plurality of first light signals of the second light redirector is a non-spherical curve or a free-form curve. The surface of the first light redirector 110 and the surface of the second light redirector 120 may comprise different curvatures; that is to say, they are part of ellipse with different major and/or minor axis. Although the first light redirector 110 and the second light redirector 120 have different curvatures; however, in some embodiment, they may be integrally formed to a one-piece optical element. The third light redirector 130 is a reflective mirror which reflects a majority (more than 60% of the received light) of the light to another direction. In other embodiment, the third light redirector 130 can be any reflective optical elements which reflects a majority (more than 60% of the received light) of the light to another direction (e.g., to the second light redirector 120). On the other hand, the first light redirector 110 or the second light redirector 120 is at least partially permeable for environmental light to enter the eye of the viewer. In the case where the present invention is applied as the optical system or AR HWDs, the second light redirector 120 may be equivalent to the combiner of the conventional AR HWDs, which allows the environmental light to pass through the second light redirector 120 into the eye of the viewer. Thereby, an augmented image comprising both virtual image and real world image can be created.

For demonstrative purpose, the following provides the specifications for the first light redirector 110 and the second light redirector 120. The diameters of the first light redirector 110 and the second light redirector 120 may respectively be ranging from 10 mm-40 mm. The distance from the center of the first and second light redirector 120 to the first focus and the second focus may respectively be from 10 mm-20 mm and 20 mm-30 mm. The distance between the center of the first light redirector 110 and the center of the second light redirector 120 is 25 mm-40 mm. The maximum FOV of the image frame may be approximately 60 degrees and the eye relief of the present embodiment is approximately 15 mm-30 mm.

Figure 8:
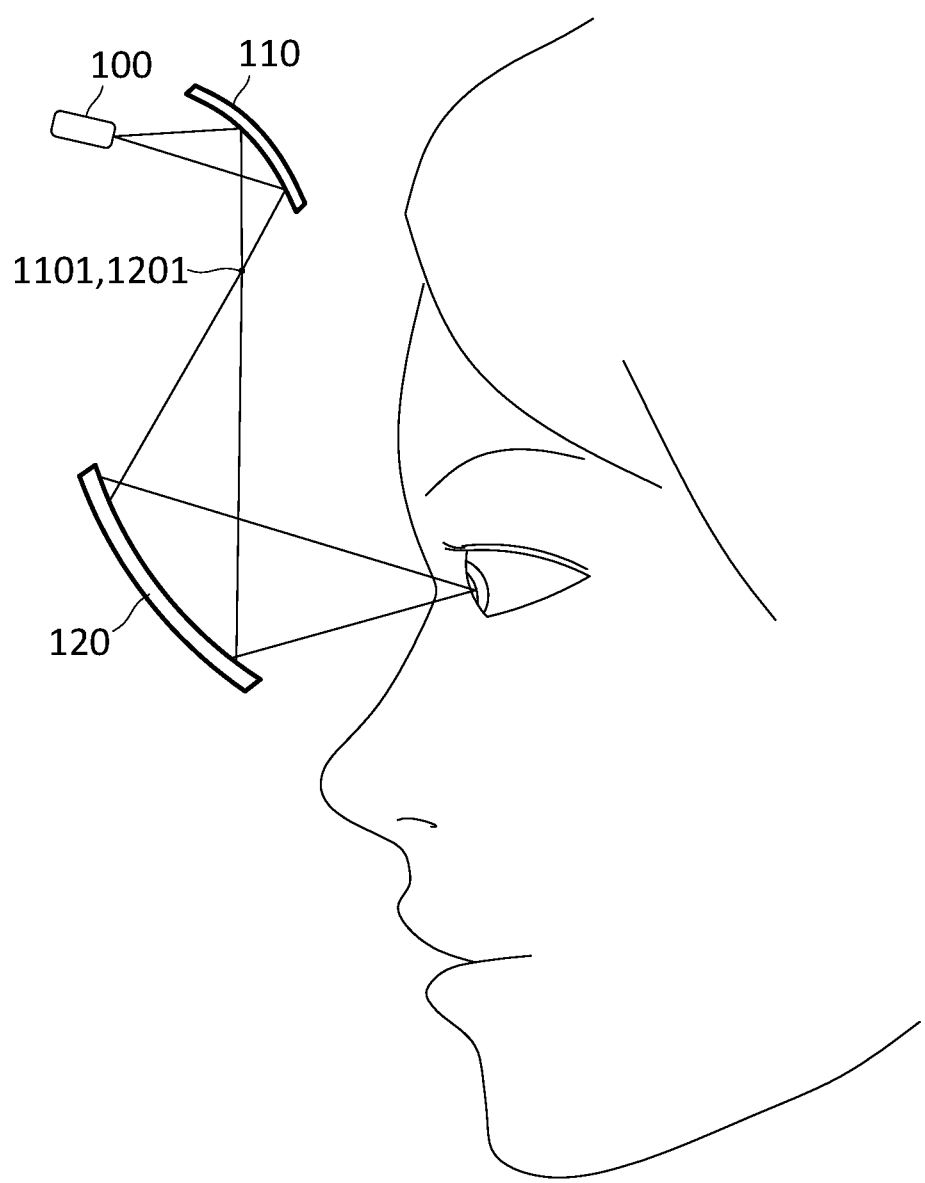
FIG. 8 is a schematic diagram illustrating another embodiment of the present invention.

With reference to FIG. 8, which show another variation of the embodiment of the present invention. The configurations and features of this embodiment are similar to that of the previously mentioned embodiments. The optic system for head wearable devices comprises the first light emitter 100, the first light redirector 110, and the second light redirector 120. The third light redirector 130 from the previous embodiment is omitted in this embodiment. The first light redirector 110 receives the plurality of first light signals and changes a direction of each of the plurality of first light signals. The second light redirector 120 directs the plurality of first light signals received from the first light redirector 110 toward an eye of a viewer, so the viewer perceives the image frame. The first light redirector 110 and the second light redirector 120 is positioned such that the first focus of the first light redirector 1101 and the first focus of the second light redirector 1201 are at a same spatial location. Furthermore, in one embodiment, the first light redirector 110 can be position at a vertical position higher than the second light redirector 120, as shown in FIG. 8. With this configuration, the light emitter is place at a location closer to the forehead of the user. In this embodiment, the geometry of the first light redirector 110 is also configured so that a light signal emitted by the first light emitter 100 in proximity to the first spatial dimension limit has a total optical path length from the first light emitter 100 to the eye of the viewer substantially equal to a total optical path length of another light signal emitted by the first light emitter 100 in proximity to the second spatial dimension limit from the first light emitter 100 to the eye of the viewer. For optimizing the FOV perceived by the viewer, the location where the plurality of first light signals is projected onto the first light redirector 110 can be adjusted to change the final FOV perceived by the viewer.

In the foregoing embodiment, the FOV of the image frame can be modified by altering the difference between the optical path length from the third light redirector 130 to the surface of the second light redirector 120 and the optical path length from the surface of the second light redirector 120 to the eye of the viewer as well. Similar to the previous embodiment, the orientation of the second light redirector 120 can be modified to change the difference between OPL1 and OPL2. In some embodiments, the geometry of the second light redirector 120 can be modified to optimize the difference between OPL1 and OPL2 to create the desirable FOV; or the angle of incident of the light signal from the first light redirector 110 to the third light redirector 130 can be modified to affect the difference between OPL1 and OPL2 to create the desirable FOV.

For demonstrative purpose, the following provides the specifications for the first light redirector 110 and the second light redirector 120 for this embodiment. The diameters of the first light redirector 110 and the second light redirector 120 may respectively be ranging from 20 mm-35 mm. The distance from the center of the first and second light redirector 120 to the first focus and the second focus may respectively be from 30 mm-40 mm and 60 mm-80 mm. The distance between the center of the first light redirector 110 and the center of the second light redirector 120 is 50-55 mm. The maximum FOV of the image frame may be approximately 60 degrees, and the eye relief of the present embodiment is approximately 60 mm.

Figure 9:
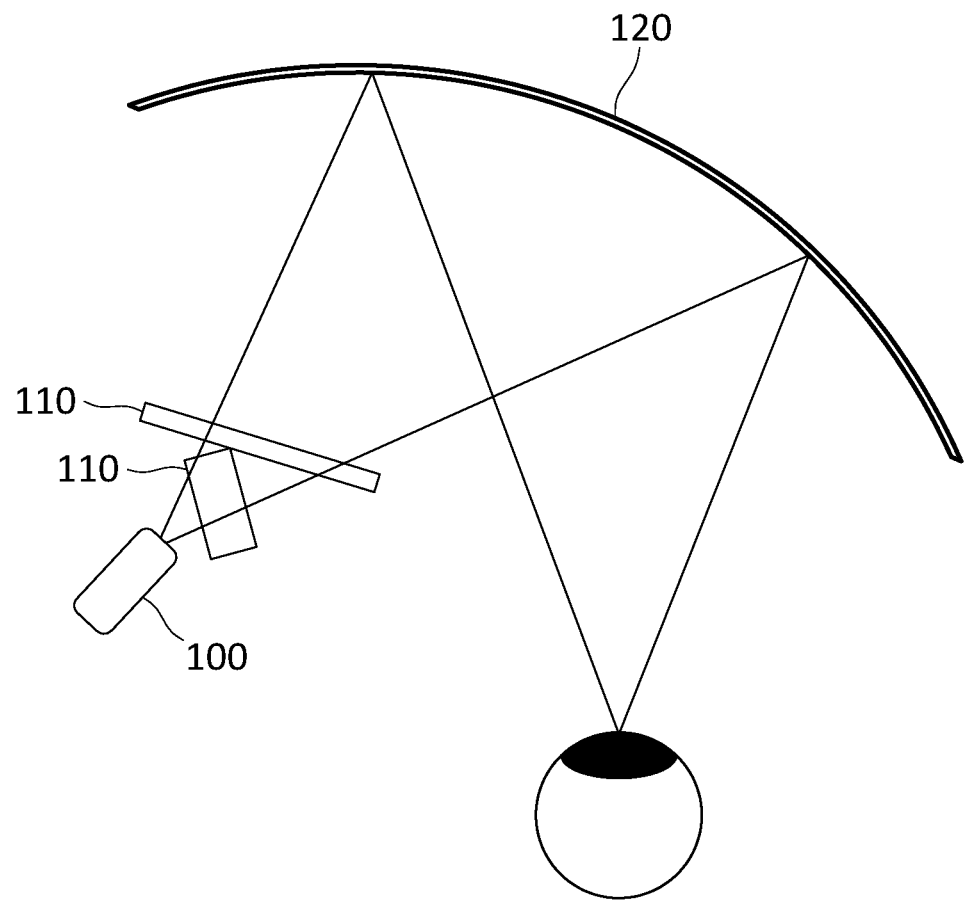
FIG. 9 is a schematic diagram illustrating yet another embodiment of the present invention.

With reference to FIG. 9, which show another variation of the embodiment of the present invention. The first light redirector 110, the second light redirector 120, and the third light redirector 130 may respectively be a cylindrical lens, an elliptical or parabolic lens, and a cylindrical lens. The first light redirector 110 and the third light redirector 130 in this embodiment are a correction assembly which serves the purpose of correcting distortion for the image frame caused by the second light redirector 120. As an example, the first light redirector 110 may be a concave lens, and the second cylindrical lens may be a convex lens.

With the design of the present embodiment, a FOV of approximately 40 degrees in the horizontal direction can be achieved. Furthermore, the FOV in the vertical direction on left side of the image frame is approximately the same as the FOV in the vertical direction on the right side of the image frame (1:1 ratio). The FOV in the horizontal direction on the top of the image frame is also similar to that of the bottom of the image frame.

Figure 10:
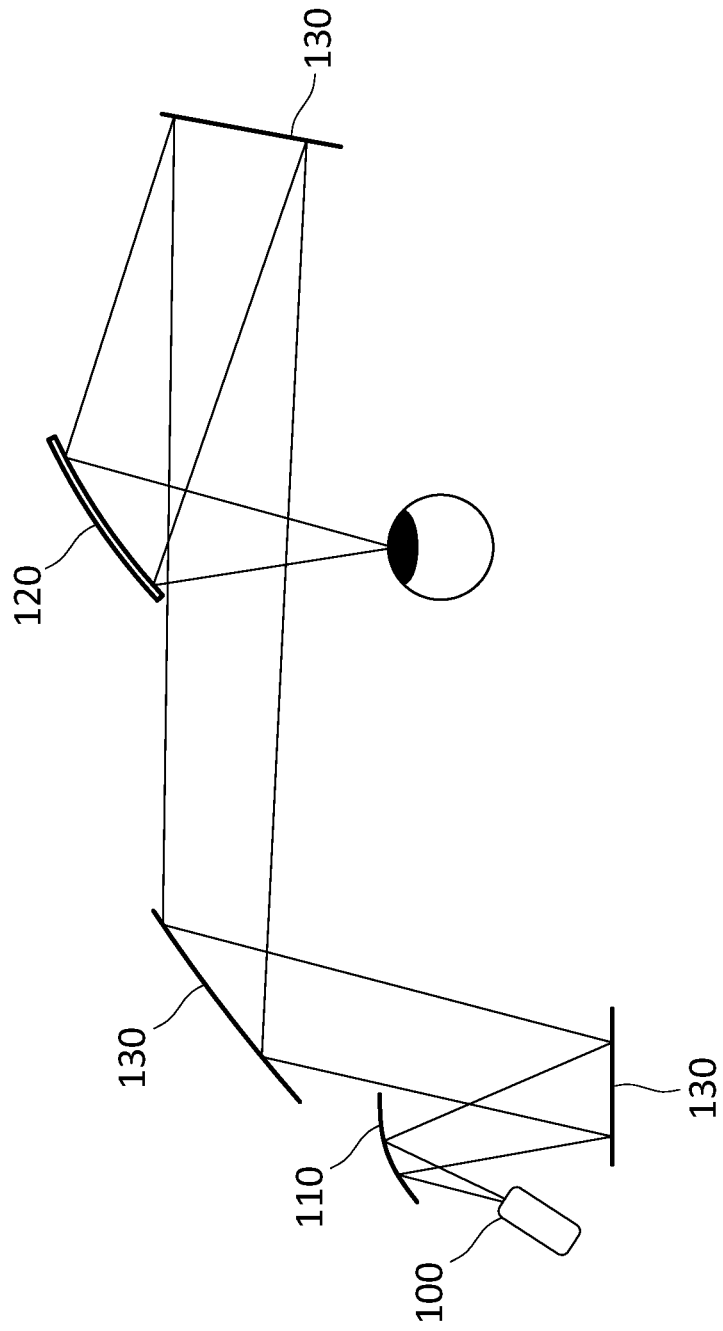
FIG. 10 is a schematic diagram illustrating yet another embodiment of the present invention.

With reference to FIG. 10, which shows another variation of the embodiment of the present invention. In the present embodiment, the optic system for HWDs comprises a first light emitter 100, a combiner (which is equivalent to the second light redirector 120), and a correction assembly. The correction assembly may comprise three transitional mirrors (which is equivalent to the third light redirector 130), and a first parabolic reflector (which is equivalent to the first light redirector 110). Transitional mirrors are located in between the first parabolic reflector and the combiner. The combiner may be a parabolic reflector. The light signals produced by the first light emitter 100 is initially reflected by the first parabolic reflector of the correction assembly to the transitional mirror. The light is then reflected by the transitional mirror to the second parabolic reflector (which may be the combiner of the head wearable device). In some embodiment, the third transitional mirror may be provided between the first transitional mirror and the second transitional mirror for increasing the optical path length of the light. The first parabolic reflector is meant to provide a complimentary light profile to balance the distortion caused by the combiner. This mean, after the light is reflected by both the first parabolic reflector and the combiner, the distortion caused by the two parabolic reflectors cancel each other, thus creating a desired light profile when light enters the viewer's eye. Another key feature of the present embodiment is that parallel light signals are created by the first parabolic reflector after the light signals are reflected by the first parabolic reflector. Therefore, the light signals between the first transitional mirror and the second transitional mirror are also parallel with each other. This is advantages because the optical path length in between the first transitional mirror and the second transitional mirror can be adjust as desired based on form factor.

Figure 11A:
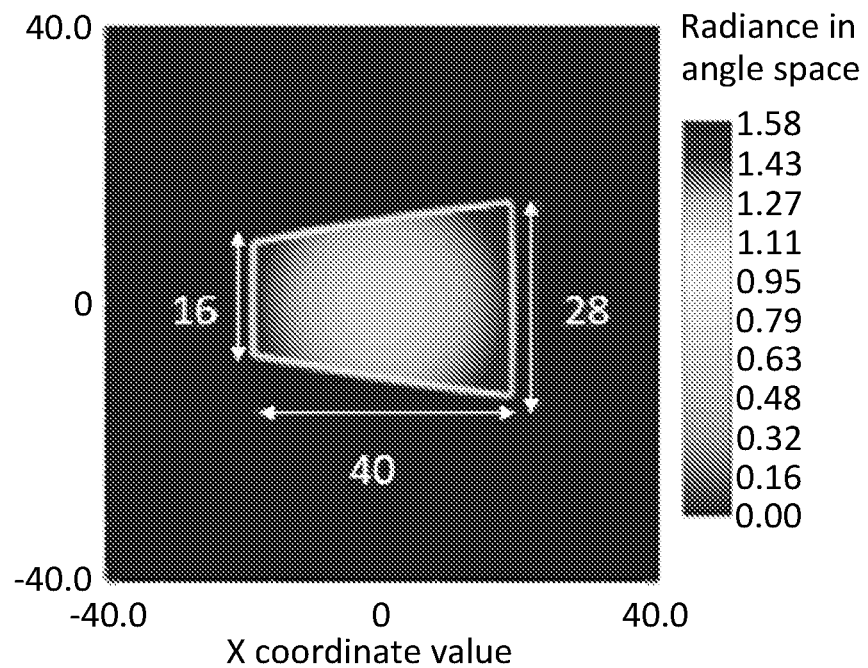
FIG. 11A illustrates an image frame quality of a conventional art.
Figure 11B:
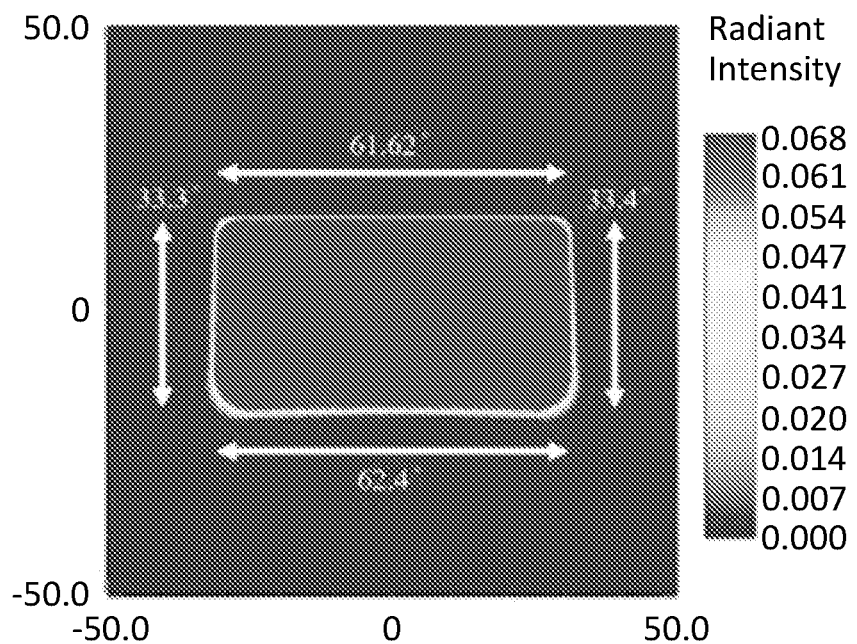
FIG. 11B illustrates an image frame quality of the present invention.

The following demonstrate the distortion correction performance of the present invention. As mentioned earlier, in some embodiment of the present invention, the image frame is substantially a quadrilateral having a first side, a second side, a third side, and a fourth side; the first side and the third side are comprised of a same number of light signals; and the second and fourth side are comprised of a same number of light signals. With reference to FIG. 11, for exemplary purpose, the present disclosure uses rectangular shaped image frame for illustrating the performance of the optic system of the present invention. FIG. 11A shows the distortion correction performance of an optic system of a conventional art without using digital correction. The final image frame suffers substantial distortion in the vertical FOV (e.g., on the second and fourth side of the image frame) and the image frame is distorted into a trapezoid shape. The FOV ratio (which is the same as the ratio of the length) of the second side to the fourth side of the image frame is approximately 0.57. FIG. 111B shows the distortion correction performance of the optic system of the present invention (also without using digital correction). The image frame retains its intended rectangular shape with the FOV ratio (which is the same as the ratio of the length) of the second side to the fourth side of the image frame close to 1. The FOV ratio of the first side to the third side (horizontal FOV) of the image frame is also close to 1. For demonstrative purpose, it has been measured that the ratio of a FOV (or length) of the first side to a FOV (or length) of the third side is 0.95-1.05; similarly, the ratio of a FOV (or length) of the second side to a FOV (or length) of the fourth side is also 0.95-1.05. Evidently, the present invention does not require digital distortion correction which involves trimming a small portion of the image frame. As a result, the entire image information (in terms of resolution and number of pixels) of the image frame can be retained with the implementation of the optic system disclosed in the present invention. In addition to FOV, with the design of the present invention, the light uniformity of light intensity across the entire image frame can be improved.

Another the key advantage of the present invention reside in that the present invention offers optical distortion correction as appose to digital correction; this feature enable the present invention to consume less power relative to HWDs utilizing digital distortion correction. Furthermore, it is already known that digital distortion correction may remove the distorted portion of the image frame during the course of image correction. In accordance with the present invention, none of the portions of the image frame will be removed. As a result, the resolution and sharpness of the image frame are retained. In addition to the advantages above, the eye relief is reduced in the present embodiment relative to the prior art. It has been proven that the eye relief of the present embodiment can be reduced to approximately 15 mm-30 mm. In addition, since both eye relief and FOV are optimized, the area of eye-box (the volume of space within which an effectively viewable image is formed) can also be expanded.

Figure 12:
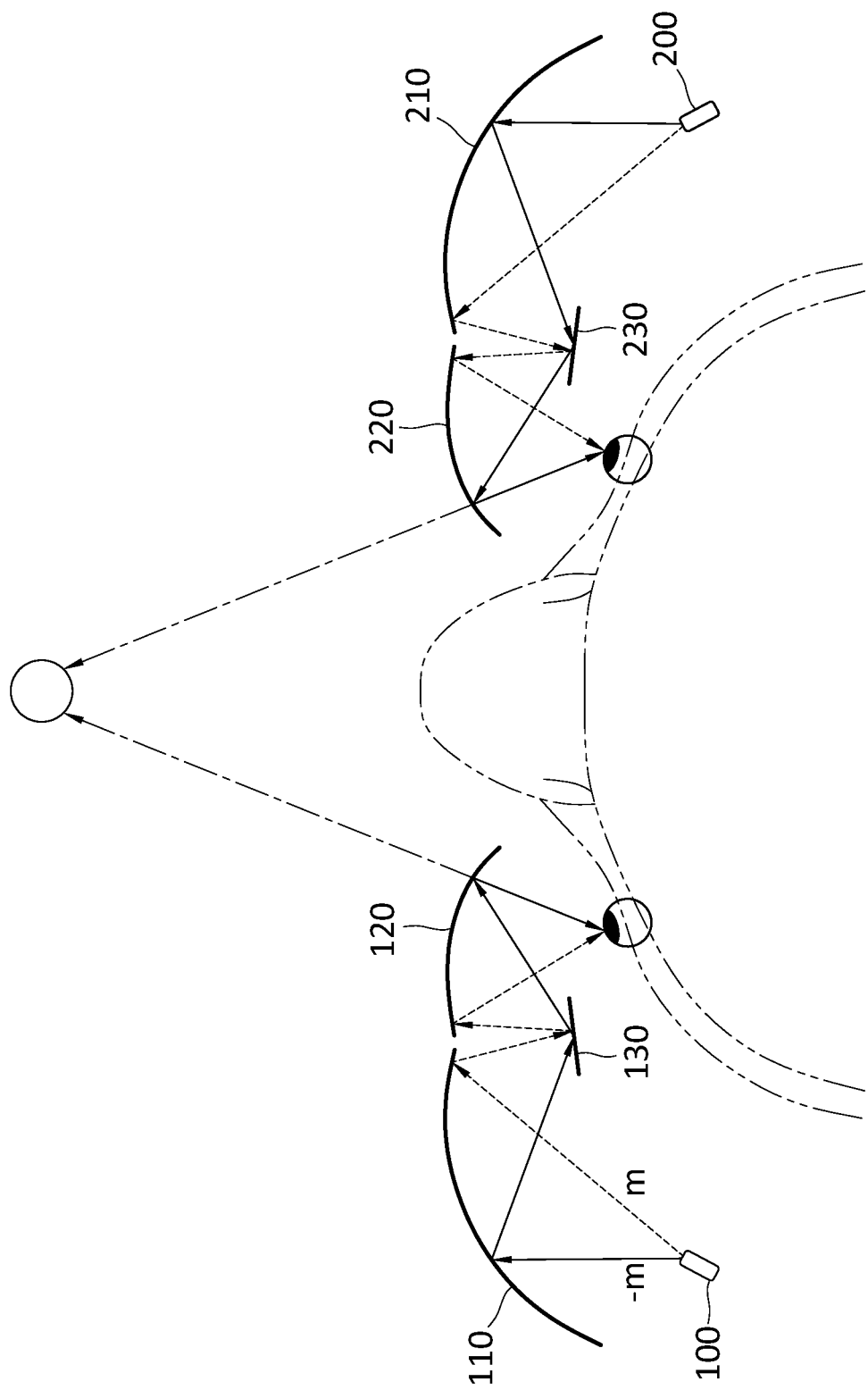
FIG. 12 is a schematic diagram illustrating an embodiment in which two sets of optical system are applied to both eyes of the viewer.
Figure 13:
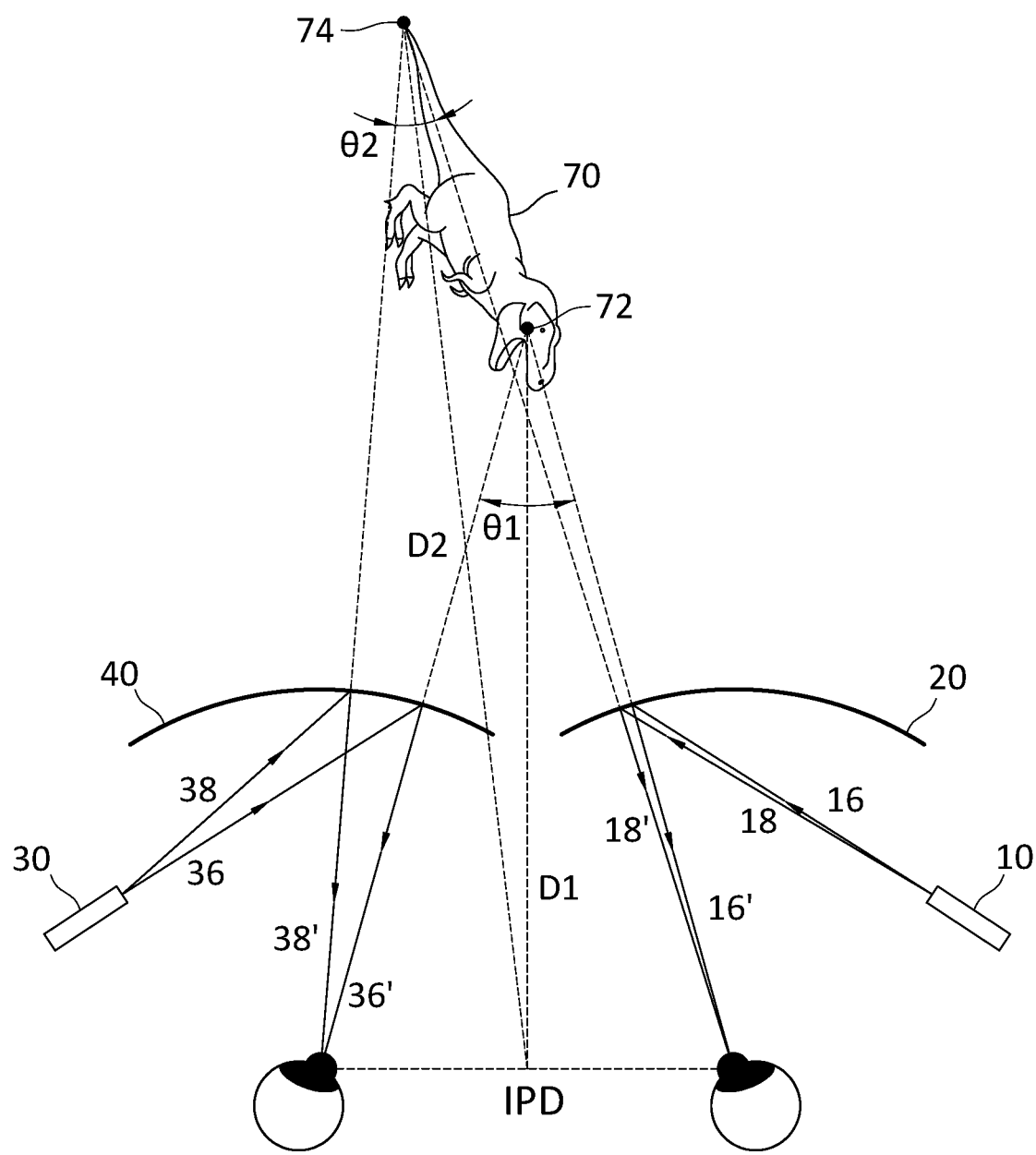
FIG. 13 illustrates the method for rendering depth perception and three-dimensional effect according to the present invention.

In order to render a virtual image in a 3-dimensional space, the optic system in accordance to the present need to be applied to both eyes of the viewer. In theory, the optic system for both eyes of the viewer should comprises the same optical elements. With reference to FIGS. 12 and 13, the method for rendering a virtual image in a 3-dimensional space is described in the following. The optic system for HWDs according to the present invention can further comprise a second light emitter 200 for emitting a plurality of second light signals. Each of the plurality of first light signals has a corresponding second light signal from the plurality of second light signals. More specifically, each of the plurality of first light signals and the corresponding second light signal can be perceived by the eyes of the viewer to form a binocular light signal via fusion of human vision; as a result, the viewer can only perceive on single binocular light signal composed of a single first light signal and the corresponding second light signal. In this embodiment, the optic system further comprises a fourth light redirector 210, and a fifth light redirector 220 for receiving the plurality of second light signals and changing a direction of each of the plurality of second light signals. Similar to the first and second light redirectors 110 and 120, the fourth light redirector 210 receives the plurality of second light signals and directs the plurality of second light signals toward the fifth light redirector 220, the fifth light redirector 220 directs the plurality of second light signals received from the fourth light redirector 210 toward an another eye of the viewer such that the plurality of second light signals is projected toward an another retina of the viewer. A first and second virtual image composed of the plurality of first and second light signals respectively are perceived by the viewer as on a side of the second light redirector 120 opposite to a side where the eye of the viewer is located, and on a side of the fifth light redirector 220 opposite to a side where the another eye of the viewer is located. The optic system may further comprise a sixth light redirector 230 (which is equivalent to the aforementioned third light redirector 130) for receiving the plurality of second light signals and changing a direction of each of the plurality of second light signals. In this case, the fourth light redirector 210 receives the plurality of second light signals and directs the plurality of second light signals toward the sixth light redirector, the sixth light redirector 230 directs the plurality of second light signals received from the fourth light redirector 210 toward the fifth light redirector 220, the fifth light redirector 220 directs the plurality of second light signals received from the sixth light redirector 230 toward the another eye of the viewer. In the present embodiment, the fourth light redirector 210 is equivalent to the first light redirector 110; the fifth light redirector 220 is equivalent to the second light redirector 120; and the third light redirector 130 is equivalent to the sixth light redirector 230.

In one embodiment, the viewer perceives a binocular virtual image or a binocular virtual pixel form by fusion of the first virtual image (or pixel) and the second virtual image (or pixel). For the convenience of describing the present invention, the binocular virtual image may be composed of only one pixel. The location of the binocular virtual image perceived by the viewer can be determined by the location of intersections between an optical path of the first light signal extending from the eye of the viewer to the second light redirector 120 and an optical path of the corresponding second light signal extending from the another eye of the viewer to the fifth light redirector 220. More importantly, according to the present invention, the depth perception of the binocular virtual image is controlled by adjusting an angle of convergence formed between the optical path extension of the first light signal and the optical path extension of the second light signals. The direction of the optical path extension of the first light signal and the second light signal can be varied by controlling a direction of projection of the first light emitter 100 and the second light emitter 200. This method for creating depth perception of the virtual image is consistent with natural vision of the human eyes because human brain determines a depth of an object in 3-dimensional space at least in part based on the angle of fixation of the eye, which is directly related to the angle of convergence formed between the optical path extension of the first light signal and the optical path extension of the second light signal. In some embodiments of the present invention, the right light signal and the corresponding left light signal for a virtual binocular pixel display an image of the same view angle. Thus, the intensity of red, blue, and green (RBG) color and/or the brightness of the right light signal and the left light signal are approximately the same. In other words, the right pixel and the corresponding left pixel are approximately the same. However, in some embodiment, the right pixel and the corresponding left pixel may not be the same.

The FIG. 13 and further describes the method for rendering depth perception in accordance with the optic system of the present invention. The viewer perceives a virtual image 70 composed of multiple binocular pixels (e.g., a first virtual binocular pixel 72 and a second virtual binocular pixel 74). The first virtual binocular pixel 72 is displayed at a first depth D1 and the second virtual binocular pixel 74 displayed at a second depth D2. The angle of convergence of the first virtual binocular pixel 72 is ⊖1 (first angle of convergence). The angle of convergence of the second virtual binocular pixel 74 is ⊖2 (second angle of convergence). The first depth D1 correlates to the first angle of convergence ⊖1. In particular, the first depth of the first virtual binocular pixel of the object can be determined by the first angle of convergence ⊖1 between the light path extensions of the first light signal 36 and the corresponding second light signal 16. The first depth D1 of the first virtual binocular pixel 72 can be calculated approximately by the following formula:

$$\operatorname{Tan}\left(\frac{\Theta}{2}\right) = \frac{IPD}{2D}$$

Figure 2:
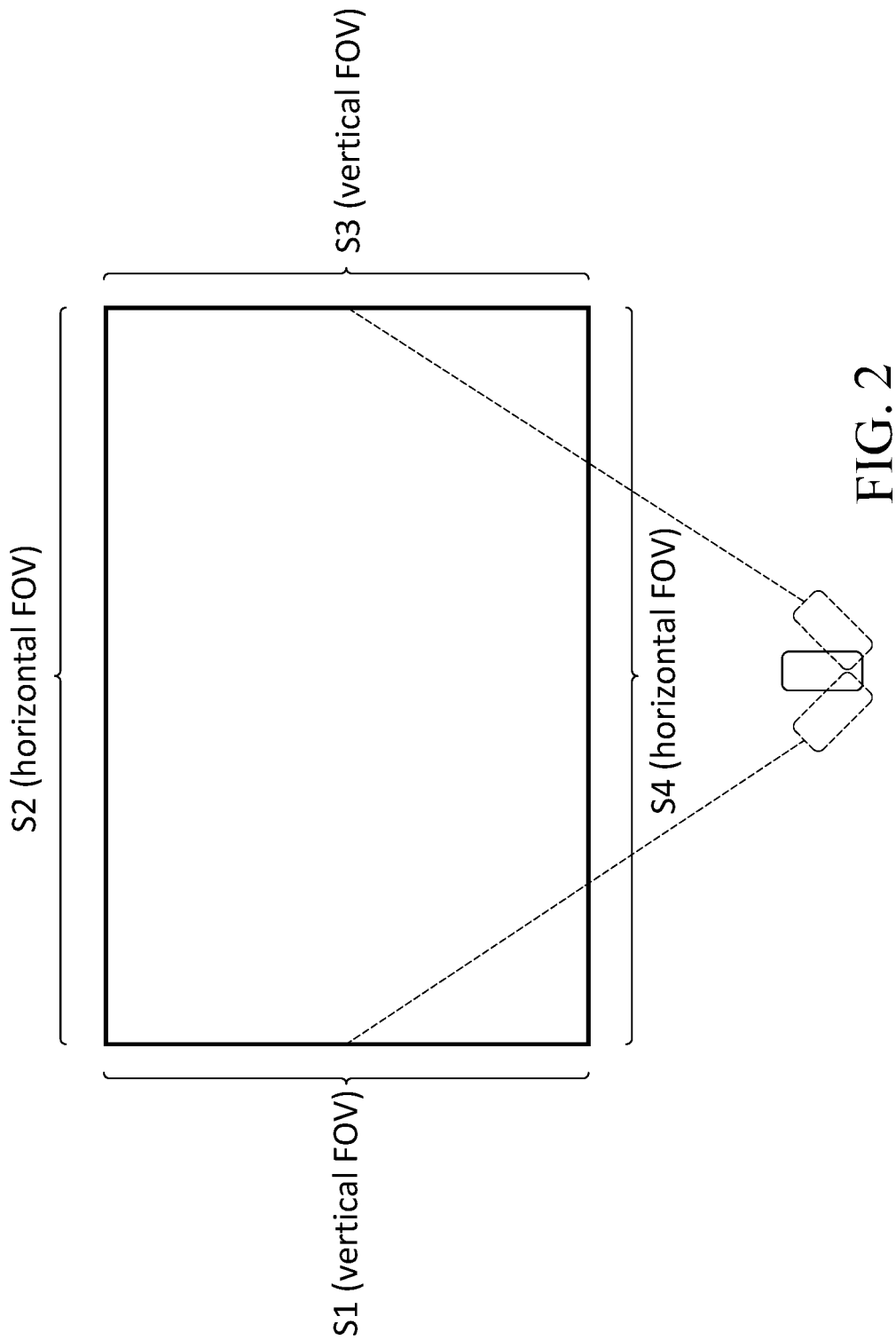
FIG. 2 illustrates the background knowledge related to the present invention.
Figure 3:
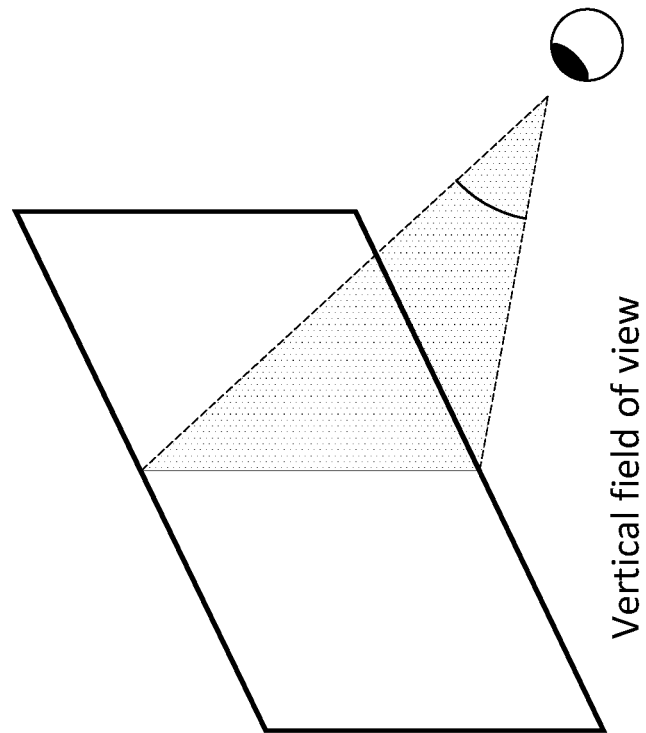
FIG. 3 illustrates the background knowledge related to the present invention.
Figure 3:
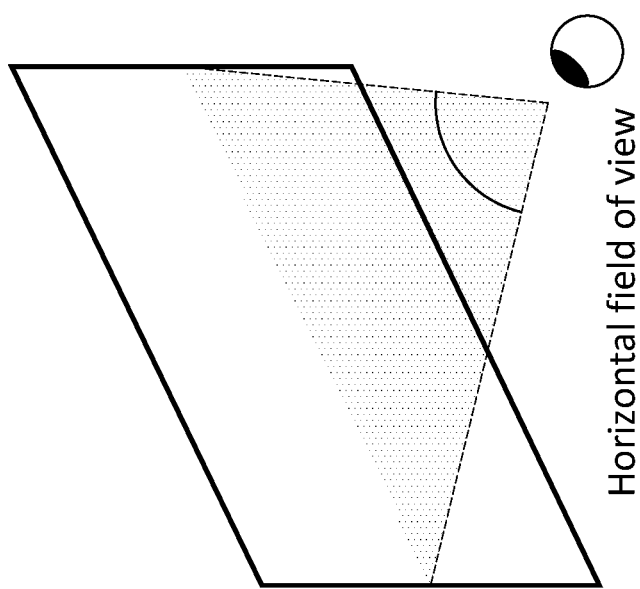

The distance between the right pupil and the left pupil is interpupillary distance (IPD). Similarly, the second depth D2 correlates to the second angle of convergence ⊖2. In particular, the second depth D2 of the second virtual binocular pixel of the object can be determined approximately by the second angle ⊖2 between the light path extensions of the first light signal 38 and the corresponding second light signal 18 with the same formula. Since the second virtual binocular pixel 74 is perceived by the viewer to be further away from the viewer (i.e., with larger depth) than the first virtual binocular pixel 72, the second angle ⊖2 is smaller than the first angle ⊖1. In addition, the angle between a redirected right light signal and a corresponding left light signal is determined by the relative horizontal distance of the right pixel and the left pixel. Thus, the depth of a virtual binocular pixel is inversely correlated to the relative horizontal distance between the right pixel and the corresponding left pixel forming the virtual binocular pixel. In other words, the deeper a virtual binocular pixel is perceived by the viewer, the smaller the relative horizontal distance at X axis between the right pixel and left pixel forming such a virtual binocular pixel is. For example, as shown in FIG. 2, the second virtual binocular pixel 74 is perceived by the viewer to have a larger depth (i.e., further away from the viewer) than the first virtual binocular pixel 72. Thus, the horizontal distance between the second right pixel and the second left pixel is smaller than the horizontal distance between the first right pixel and the first left pixel on the retina images.

In some variations of the present invention, the depth perception of the binocular image frame or binocular pixel may be a combination of the method aforementioned and the conventional parallax method (in part by the method disclosed in the present invention and in part by the parallax method). However, in some embodiment, the depth perception can be mainly rendered by the method disclosed in the present invention.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. An optic system for head wearable devices, comprising:
   a first light emitter for emitting a plurality of first light signals, the first light emitter varying a direction of projection between a first spatial dimension limit and a second spatial dimension limit in a first dimension;
   a first light redirector, and a second light redirector for receiving the plurality of first light signals and changing a direction of each of the plurality of first light signals; and
   a third light redirector, located in proximity to a first focus of the first light redirector and a first focus of the second light redirector, the third light redirector being a reflective mirror,
   wherein the first light redirector receives the plurality of first light signals and directs the plurality of first light signals toward the second light redirector, the second light redirector directs the plurality of first light signals received from the first light redirector toward an eye of a viewer, so the viewer perceives a first image frame composed of the plurality of first light signals,
   wherein a geometry of the first light redirector is configured such that a light signal emitted by the first light emitter in proximity to the first spatial dimension limit has a total optical path length from the first light emitter to the eye of the viewer substantially equal to a total optical path length of another light signal emitted by the first light emitter in proximity to the second spatial dimension limit from the first light emitter to the eye of the viewer,
   wherein the first light redirector and the second light redirector is positioned such that a first focus of the first light redirector and a first focus of the second light redirector are at a same spatial location.

2. The optic system for head wearable devices of claim 1, wherein a total optical path length from the first light emitter to the eye of the viewer of a first light signal of the plurality of first light signals not being emitted in proximity to the first spatial dimension limit or the second spatial dimension limit is substantially equal to the total optical path length of the light signal emitted by the first light emitter in proximity to the first spatial dimension limit and the second spatial dimension limit.

3. The optic system for head wearable devices of claim 1, wherein the first light redirector receives the plurality of first light signals and directs the plurality of first light signals toward the third light redirector, the third light redirector directs the plurality of first light signals received from the first light redirector toward the second light redirector, the second light redirector directs the plurality of first light signals received from the third light redirector toward an eye of a viewer.

4. The optic system for head wearable devices of claim 1, wherein the first light emitter is located in proximity to a second focus of the first light redirector.

5. The optic system for head wearable devices of claim 1, wherein the eye of the viewer is located in proximity to a second focus of the second light redirector.

6. The optic system for head wearable devices of claim 1, wherein the first light redirector comprises two foci located on a same side of the first light redirector.

7. The optic system for head wearable devices of claim 1, wherein the second light redirector comprises two foci located on a same side of the second light redirector.

8. The optic system for head wearable devices of claim 1, wherein a converge angle of the plurality of the first light signals when traveling form the second light redirector to the eye of the viewer correlates to a field of view of the first image frame to the eye of the viewer.

9. The optic system for head wearable devices of claim 8, wherein the field of view of the first image frame perceived by the eye of the viewer is modified by any one of the methods which include changing an orientation of the second light redirector relative to the eye of the viewer, changing an angle of reflection of the third light redirector, and changing a curvature of the third light redirector.

10. The optic system for head wearable devices of claim 1, wherein the geometry of the first light redirector includes a curvature of a surface of the first light redirector, and a location of the first focus of the first light redirector and a location of a second focus of the first light redirector.

11. The optic system for head wearable devices of claim 1, wherein a surface for receiving the plurality of first light signals of the first light redirector or a surface for receiving the plurality of first light signals of the second light redirector is an elliptic curve.

12. The optic system for head wearable devices of claim 1, wherein a surface for receiving the plurality of first light signals of the first light redirector or a surface for receiving the plurality of first light signals of the second light redirector is a non-spherical curve or a free-form curve.

13. The optic system for head wearable devices of claim 1, wherein the first light redirector and the second light redirector are integrally formed.

14. The optic system for head wearable devices of claim 1, wherein the first light redirector or the second light redirector is at least partially permeable for environmental light to enter the eye of the viewer.

15. The optic system for head wearable devices of claim 1, wherein the first light redirector receives the plurality of first light signals and directs the plurality of first light signals toward the second light redirector such that the plurality of first light signals is directed toward a retina of the viewer and a first virtual image in the first image frame composed of the plurality of first light signal is perceived by the viewer as on a side of the second light redirector opposite to a side where the eye of the viewer is located.

16. The optic system for head wearable devices of claim 15, further comprising:
- a second light emitter for emitting a plurality of second light signals;
- a fourth light redirector, and a fifth light redirector for receiving the plurality of second light signals and changing a direction of each of the plurality of second light signals;
- wherein the fourth light redirector receives the plurality of second light signals and directs the plurality of second light signals toward the fifth light redirector, the fifth light redirector directs the plurality of second light signals received from the fourth light redirector toward an another eye of the viewer such that the plurality of second light signals is directed toward an another retina of the viewer and a second virtual image from a second image frame composed of the plurality of second light signals is perceived by the viewer as on a side of the fifth light redirector opposite to a side where the another eye of the viewer is located,
- wherein the viewer perceives a binocular virtual image formed by fusion of the first virtual image and the second virtual image, wherein a location of the binocular virtual image is determined by intersections between an optical path of the plurality of first light signals extending from the eye of the viewer to toward the second light redirector and an optical path of the corresponding plurality of second light signals extending from the another eye of the viewer to the fifth light redirector, a depth perception of the binocular virtual image is determined at least in part by an angle of convergence formed between the optical paths of the plurality of first light signals and the optical paths of the plurality of second light signals.

17. The optic system for head wearable devices of claim 16, further comprising:
- a sixth light redirector for receiving the plurality of second light signals and changing a direction of each of the plurality of second light signals;
- wherein the fourth light redirector receives the plurality of second light signals and directs the plurality of second light signals toward the sixth light redirector, the sixth light redirector directs the plurality of second light signals received from the fourth light redirector toward the fifth light redirector, the fifth light redirector directs the plurality of second light signals received from the sixth light redirector toward the another eye of the viewer,
- wherein the sixth light redirector is located in proximity to a first focus of the fourth light redirector and a first focus of the fifth light redirector.

18. The optic system for head wearable devices of claim 1, wherein the first light redirector receives the plurality of first light signals and directs the plurality of first light signals toward the second light redirector such that the plurality of first light signals is directed toward a retina of the viewer and a plurality of first virtual pixel is formed on a side of the second light redirector opposite to a side where the eye of the viewer is located.

19. The optic system for head wearable devices of claim 18, further comprising:
- a second light emitter for emitting a plurality of second light signals; and
- a fourth light redirector, and a fifth light redirector for receiving the plurality of second light signals and changing a direction of each of the plurality of second light signals;
- wherein the fourth light redirector receives the plurality of second light signals and directs the plurality of second light signals toward the fifth light redirector, the fifth light redirector directs the plurality of second light signals received from the fourth light redirector toward an another eye of the viewer such that the plurality of second light signals is projected toward an another retina of the viewer and a plurality of second virtual pixels from a second image frame is formed on a side of the fifth light redirector opposite to a side where the another eye of the viewer is located,
- wherein the viewer perceives a binocular virtual pixel by fusion of one of the plurality of first virtual pixels and a corresponding second virtual pixel from the plurality of the second virtual pixels,
- wherein a location of the binocular virtual pixel is determined by intersection between an optical path of the one of the plurality of first virtual pixels extending from the eye of the viewer to the second light redirector and an optical path of the corresponding second virtual pixel extending from the another eye of the viewer to the fifth light redirector, a depth perception of the binocular virtual pixel is determined by an angle of convergence formed between the optical paths of the one of the plurality of first virtual pixels extending from the eye of the viewer to the second light redirector and the optical path of the corresponding second virtual pixel.

20. The optic system for head wearable devices of claim 19, further comprising:
- a sixth light redirector for receiving the plurality of second light signals and changing a direction of each of the plurality of second light signals;
- wherein the fourth light redirector receives the plurality of second light signals and directs the plurality of second light signals toward the sixth light redirector, the sixth light redirector directs the plurality of second light signals received from the fourth light redirector toward the fifth light redirector, the fifth light redirector directs the plurality of second light signals received from the sixth light redirector toward the another eye of the viewer,
- wherein the sixth light redirector is located in proximity to a first focus of the fourth light redirector and a first focus of the fifth light redirector.

* * * * *